PORTABLE SOUND INSTRUMENT

Filed Nov. 19, 1958 2 Sheets-Sheet 1

INVENTOR
ARTHUR STEIDINGER
HANS-GERHARD HAGENAH
GUNTHER STEINLE

BY Fisher Christen & Goodson
ATTORNEYS

June 2, 1964 A. STEIDINGER ETAL 3,135,835

PORTABLE SOUND INSTRUMENT

Filed Nov. 19, 1958 2 Sheets-Sheet 2

INVENTOR

ARTHUR STEIDINGER
HANS GERHARD HAGENAH
GÜNTHER STEINLE

BY Fisher, Christen & Goodson

ATTORNEYS 3,135,835
Patented June 2, 1964

3,135,835
PORTABLE SOUND INSTRUMENT

Arthur Steidinger, Gewerbehallestrasse 12, Hans-Gerhard Hagenah, Abt. Theoger Strasse 25, and Günther Steinle, Luisenstrasse 42, all of St. Georgen, Black Forest, Germany Filed Nov. 19, 1958, Ser. No. 775,000
Claims priority, application Germany Nov. 22, 1957
3 Claims. (Cl. 179—100.1)

This invention relates to portable sound reproducing instruments and specifically to portable phonographic amplifier instruments having their loudspeakers located in the cover portions of the instruments.

An object of this invention is the provision of a particularly novel arrangement of the speakers and corresponding matching locations for the elements housed in the bottom part of the case. According to this invention, at least two of the loudspeakers arranged in the cover form an interspaced pair of speakers with inclined diverging directions of radiation. This inclined pair of speakers is mounted in the two corners located on the top part of the cover when it is opened and locked in a vertical position. The inclined pair of speakers take up only a small fraction of that surface of the cover which permits the remaining space to receive the tone arm when the cover is in the closed position.

A second set of speakers is located below the inclined pair and have a direction of radiation roughly perpendicular to the cover surface.

It is advisable to select "Tweeters" for the pair of inclined speakers and "Woofers" for the horizontal type speakers.

To take advantage of the aforementioned free space in the cover of the case, this invention teaches the arrangement of any such parts of the instrument located in the bottom section of the case as project beyond the chassis (pick-up arm of phonographs and soundhead of tape recorders) within the range of the said free space in the closed cover.

The arrangement of the speakers makes it possible to provide sound pressure compensation apertures for the speakers in the side walls of the cover and in the partition walls between the compartments for the inclined and the horizontal-type speakers.

Another object of this invention is to provide a phonograph housing having the rotating playback mechanism centrally located, with the controls on one side of the housing and a space for cables on the other. This arrangement in the bottom housing of the instrument is such that the phonograph play-back mechanism is located between two lateral compartments, one designed for housing the reproducing amplifier and the controls, and the other the necessary cables.

A still further object of this invention is the provision of a detachable cover having two separable sections with speaker units in each section. This arrangement permits high stereophonic reproductions in compact portable units.

These and other objects of the invention will become more readily apparent from the following detailed description of the invention taken in conjunction with the accompanying drawings in which.

Figure 1:
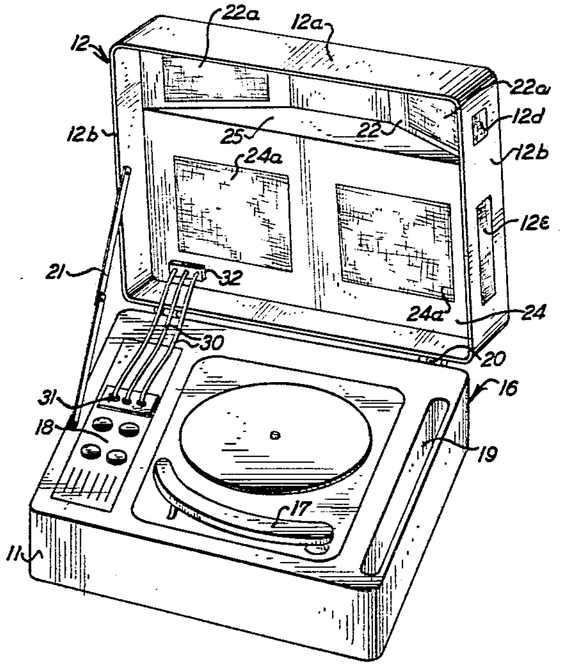
FIG. 1 is a perspective view of a portable amplifier type phonograph with the cover locked in raised vertical position.

FIG. 1 shows a chassis 16 of a phonograph comprising a bottom housing 11 and a cover 12 with pick-up arm 17 located on the bottom housing 11. On one side of this housing is the reproducing amplifier means 18, and on the other side a cable storage compartment 19. The hollow cover 12 is mounted to the bottom part of the case by hinges 20 and the cover may be locked in a raised, vertical position by means of the rod assembly 21 of any conventional design, as shown in FIG. 1.

Figure 3:
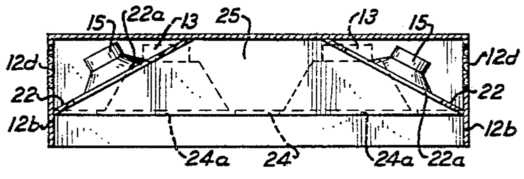
FIG. 3 is a cross-sectional view of the cover along line 3—3 of FIG. 2.

The speakers 15 are provided behind inclined baffles 22 in the corners of the top inside of cover 12 (FIG 3), and sound outlets 22*a* are shown in the baffles. The direction of sound radiation of the speakers 15, which should preferably be in the form of "Tweeters," is slanted somewhat toward the inside of the cover, but is inclined with regard to the normal of the cover surface. The two speakers 15 form, therefore, an inclined pair of speakers.

Beneath the said speakers 15 (when the cover is locked in the raised position as shown in FIG. 1) there are further speakers with baffles 24 and sound outlets 24*a* parallel to the cover surface. Due to this arrangement of speakers and their baffles a free space is formed between the baffles 22 of the inclined speakers 15. One side wall 12*a* of cover 12 and side wall 25 of the compartment housing the speakers 13, which, when the cover is closed, serves to housethe pick-up arm 17 projecting much above the chassis 16 of the phonograph.

Pressure compensation apertures 12*d* and 12*e* are shown in the side walls 12*b* of the cover. Another such aperture (12*f*) is provided in the rear wall of the cover. Finally the partition wall 25 between the two sets of speakers has one such pressure compensation hole 25*a* each between the compartment for the speakers 13 and the compartments for the speakers 15.

Thus, it can be seen that applicant has provided a portable phonograph, having a maximum amount of fidelity in a minimum space.

FIGURE 1 shows the cables 30 connected to the cover 12, via plug outlets 31 and 32 in the housing 11 and cover 12 respectively. These cables are disconnected and placed in the receptacle 19 when the phonograph is not in use.

Figure 5:
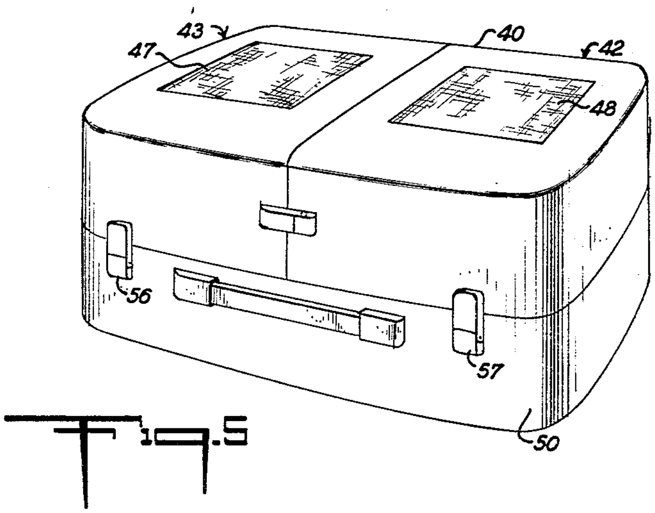
FIG. 5 is a perspjective view of a further embodiment of this invention in closed position.
Figure 6:
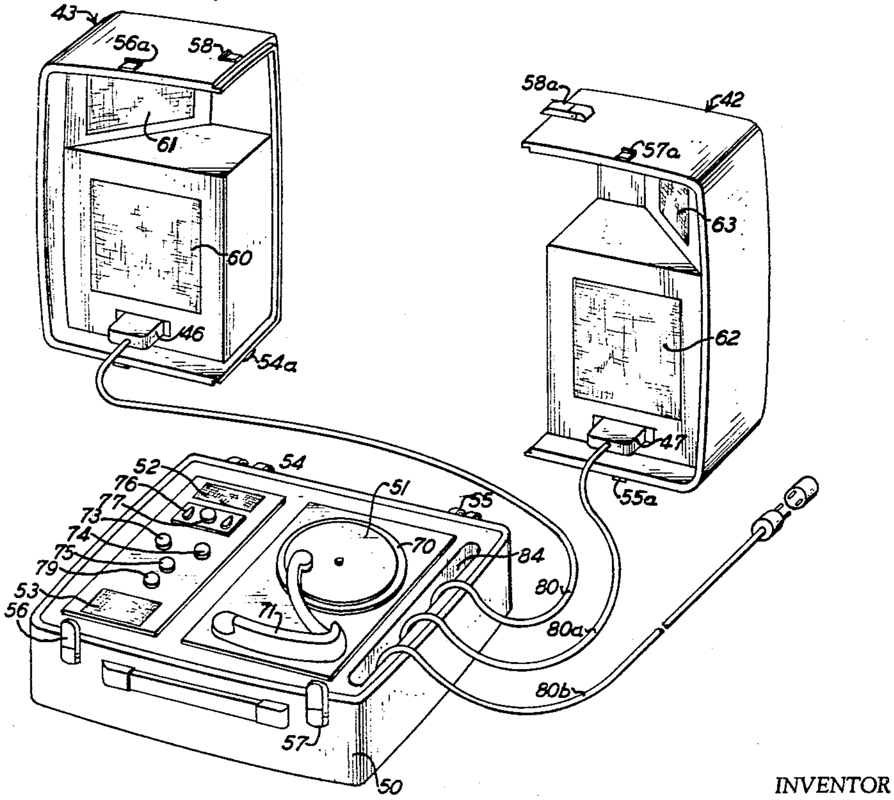
FIG. 6 is the embodiment of FIG. 5 with cover removed and the instrument in the operating position.

A further embodiment of this invention is shown in FIGS. 5 and 6. One of the latest developments in the field of phonographic equipment is a procedure for what is called stereophonic recording and stereophonic reproduction of speaking voice and music by means of stereophonic recording media. When reproduced, such recording media produce an effect of perspective (also referred to as "third-dimensional sound") which it is possible to increase by means of a suitable distribution of the tone sources throughout the room. Recording media of this type are provided with two sound tracks, one of which may, for instance, be provided with Berlin script and the other with Edison script, both tracks being situated in the same groove. For the reproduction of both sound tracks two reproduction channels must be provided, which are substantially constituted of amplifiers and speakers.

The manufacture of portable instruments for the stereophonic reproduction of recording media is connected with certain difficulties if the tonal advantages of this type of reproduction are to be used to advantage. It is even difficult to house a plurality of amplifiers and speakers in a limited space. Moreover, the stereophonic reproduction cannot develop all its tonal merit unless the speakers for both reproduction channels are spaced at a distance of at least one meter.

Figure 4:
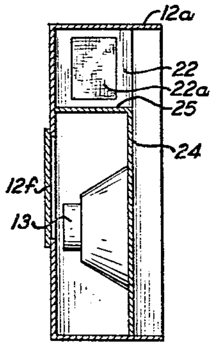
FIG. 4 is a longitudinal section of the cover along line 4—4 of FIG. 2.
Figure 2:
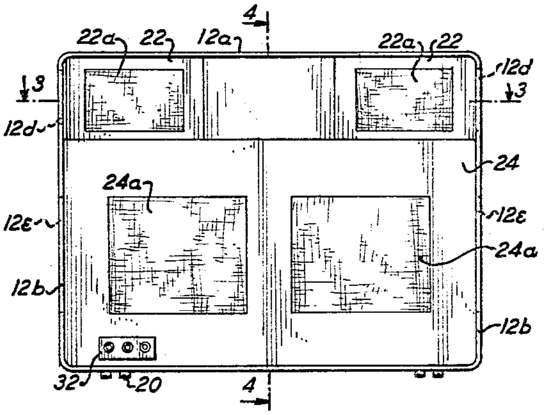
FIG. 2 is a plan view of the inside of the cover.

The portable instrument, according to the embodiment shown in FIGS. 4 and 5, meets the requirements as to the housing of the speakers in an extremely limited space and their distribution in the room as required to take advantage of the tonal qualities of the stereophonic reproduction. It serves for the stereophonic reproduction of stereophonic recording media having at least two sound tracks with each sound track having a separate reproduction channel comprising one amplifier and at least one speaker, but preferably a group of speakers, and is characterized in that at least the speakers of the various channels are located inside the cover of the portable instrument and that the said cover is detachable and divisible with the individual reproduction channels and is capable of being separated from each other.

According to the embodiment shown in FIGS. 4 and 5 the cover sections may be set up in such a manner that the speakers inside such cover sections have a horizontal direction of radiation. The amplifiers of the various reproduction channels of the portable instrument according to the invention may also be located inside the cover in such a manner that when the cover sections are separated each section houses one amplifier channel.

According to this embodiment, the separable cover sections may be provided with means for coupling the sections together even when they are detached. The loudspeakers of one group of speakers located inside one cover section with such cover section forming the cabinet of such speakers, may include speakers of different pitch and different direction of radiation. Each cover section may have one pressure compensation aperture preferably of the grid-covered type.

Another advantage of this embodiment is that the hollow spaces inside the cover, not occupied by the speakers, are arranged in such a manner as to permit the accommodation of the projecting pick-up arm when the cover is closed. The volume controls of the various reproduction channels may be coupled to a joint actuating member. Where rotary-type volume controls are used, those elements may according to the invention be mounted on a common pivot provided with the actuating member. According to the invention the controls may be coupled by means of an adjustable coupling permitting an adjustment of the relative position of the volume controls of the various reproduction channels, as coupled to the common actuating member.

The cover 40 comprises the two halves 42 and 43 and is adapted to mate with the bottom housing 50 of the case, which carries the play-back mechanism and the stereophonic amplifiers 52 and 53. The cover is held in place on the bottom part of the case by separable hinges 54 and 55, and two locks, 56, 57 and 56*a*, 57*a*, while the two halves of the cover are coupled by a locking device 58 and 58*a*. The hinges 55 and 56 are designed to permit the cover when in raised position to be lifted out of the hinge sections 54*a* and 54*b* and to be set up separate from the bottom housing 50 of the case. By opening the locking devices 56 and 57 the two cover sections 52 and 53 can be drawn apart and set up separately at a distance of one meter or more. The cover sections house the speakers, each section housing "woofers" 60, 62 for lows and "tweeters" 61, 63 for highs. The speakers in cover section 42 serve for reproducing one sound track, while the speakers in cover section 43 reproduce the other sound track of the record.

Located in the bottom housing 50 of the case is the play-back mechanism 51 (FIG. 6), of which recording medium 70 and pick-up arm 71 are shown in the drawing. In addition, the bottom housing contains a stereophonic amplifier assembly comprising two stereophonic amplifiers 52 and 53. Either one of the said two stereophonic amplifiers is used for amplifying one of the two sound tracks. In addition, the cover plate of the amplifier assembly carries the control elements of a voltage selector switch 76, a fuse carrier 77, as well as two tone controls 73 and 74, one each for the two reproduction channels for the two sound tracks. Further provided is one pilot lamp 75, and one volume control 79, which may jointly control the two reproduction channels.

The cables 80, 80*a*, 80*b*, designed for connection of the instrument to the power source by cable 80*b* and to the speaker groups located in the cover sections 42 and 43 by cables 80*a* and 80*b*. The cables are all adapted to be stored in space 84 when the cover sections are placed on the housing. Cables 80*a* and 80*b* plug into the receptacles 46 and 47 of the cover sections 43 and 42 respectively.

As in the first embodiment, the speakers are mounted in the cover sections in such a manner that the parts of the instrument located in the bottom part of the case and projecting beyond the top edge thereof are accommodated in the hollow spaces of the cover when the cover is closed.

As will be apparent from the drawing of the cover sections in FIG. 6, the "woofers" for the lows 60 and 62 have a direction of radiation different from that of the "tweeters" for the highs 61 and 63. Furthermore, the speakers are mounted in such a manner that their direction of radiation is horizontal when the cover sections are set up in the manner as shown by FIG. 6. Pressure compensation apertures 49 and 48 are provided in the top surface of the cover sections forming the rear front of the speakers, which are preferably of the grille-covered type.

While the invention has been described in terms of certain examples, such examples are to be construed as illustrative rather than limiting. Further embodiments and modifications will be apparent to those skilled in the art, and it is intended to cover all such embodiments and modifications that fall within the spirit and scope of the appended claims.

We claim:

1. In portable stereophonic sound reproducers, the combination including, a generally rectangular carrying case subdivided along a medial plane into a single bottom housing and an upper housing, said upper housing being subdivided along a plane normal to said first-mentioned plane into two covers, record play-back mechanism and electrical amplifier means mounted in said bottom housing, said record play-back mechanism including turntable means and pick-up means accessible for use only when said covers have been removed, two substantially identical electrical speaker means contained one in each of said covers, electrical cables to connect each of said speaker means to said amplifier means, means to store said cables within said carrying case, and fastener means separably joining said covers to each other and to said bottom housing, whereby when said carrying case is closed all of said sound reproducing components are contained therewithin.

2. The invention as defined in claim 1, wherein said pick-up mechanism projects upwardly above the plane of the turntable means, and each of said speaker means occupies only a portion of the space defined by the walls of the respective covers, the space unoccupied by at least one of said speakers defining a recess within which said pick-up mechanism may be accommodated when the carrying case is closed.

3. The invention as defined in claim 1, wherein said amplifier means is provided with manual control means, said control means being inaccessible when said carrying case is closed.

References Cited in the file of this patent

UNITED STATES PATENTS

| | | |
|---|---|---|
| 1,742,832 | Thomas | Jan. 7, 1930 |
| 2,547,447 | De Boer | Apr. 3, 1951 |
| 2,710,662 | Camras | June 14, 1955 |
| 2,923,370 | De Capite | Feb. 2, 1960 |